SAMUEL STROOCK.
Improvement in Milk Cans.
No. 118,887.   Patented Sep. 12, 1871.
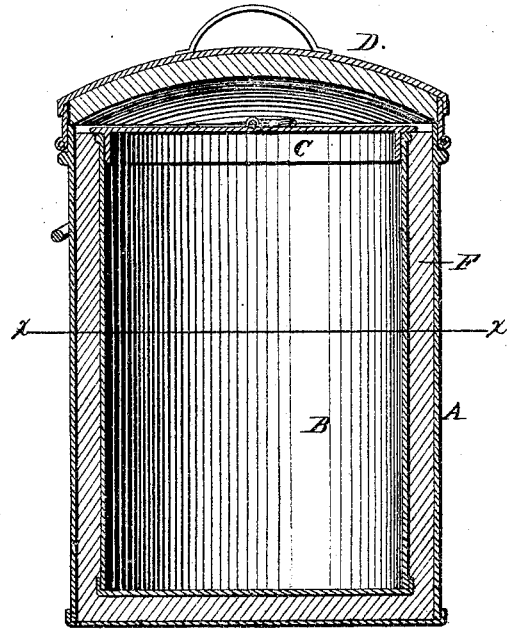
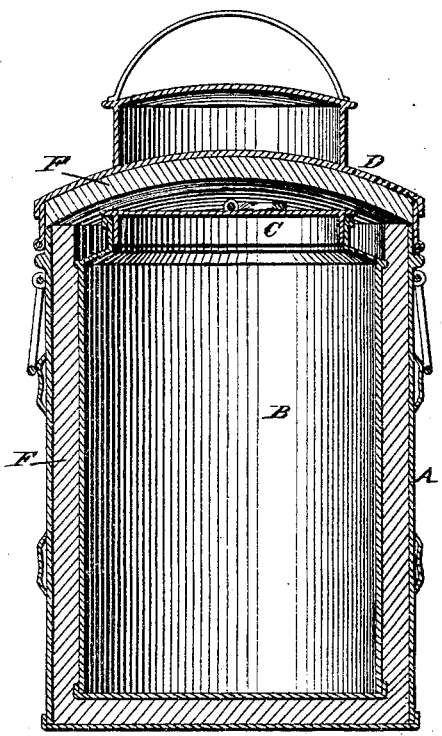
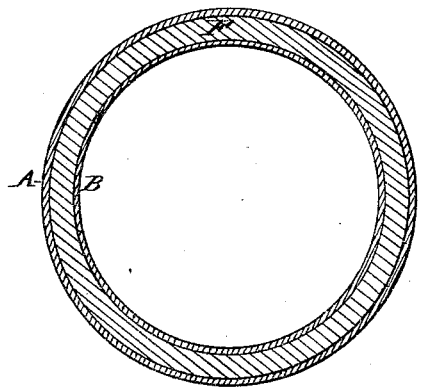
Witnesses.
Harry King
Phil. T. Dodge
Inventor.
Sam'l Stroock
by Dodge & Munn
Att'ys

UNITED STATES PATENT OFFICE.

SAMUEL STROOCK, OF NEW YORK, N. Y.

IMPROVEMENT IN MILK-CANS.

Specification forming part of Letters Patent No. 118,887, dated September 12, 1871.

*To all whom it may concern:*

Be it known that I, SAMUEL STROOCK, of New York, in the city and county of New York, have invented certain Improvements in Cans for Milk and other purposes, of which the following is a specification, reference being had to the accompanying drawing.

My invention relates to milk-cans and vessels used for similar purposes; and the invention consists in making the same with hollow walls and interposing a filling of felt, as hereinafter explained.

Figures 1 and 2 are transverse vertical sections of vessels made on my plan, and Fig. 3 is a transverse horizontal section of the same.

In constructing my improved vessel I first make a body, B, of the required form and size, and cover it with a thick body of hair-felt, as indicated by F of the several figures, this inner body or can B being provided with a cover, C, as represented. I then make an outer body or case, A, of sufficient size to slip over and inclose the inner one with its felt covering, as represented in the drawing. I then provide a cover, D, for the outer case A, which cover I also line with felt, as shown in Figs. 1 and 2. The bail or handles are, of course, secured to the outer case A, whereby the vessel as a whole may be readily handled.

A vessel thus made is especially adapted for the conveyance of milk to market, and also for storing it for use in families, hotels, and restaurants, as, by the non-conducting qualities of the interposed layer of felt it is kept cool and can therefore be preserved sweet and fit for use a much longer time. Such vessels are also admirably adapted to the keeping and transporting of ice-cream, and will largely decrease the expense of purchasing ice for such purposes, besides being lighter and easier to handle than the ordinary buckets and ice used for that purpose. So, too, these vessels are useful for retaining the heat of soups or other articles that it may be desired to convey for the dinner of workmen, they, of course, being made of any required size.

By the method of constructing them it will be seen that the inner body with its felt covering can be readily lifted out of the outer case, when the felt can be removed from the inner case. This is important because, by the condensation of moisture, the felt would become damp and also moldy or musty, and thus taint the milk, which is peculiarly susceptible to injury from such causes. Being made removable, the parts can be scalded, cleaned, and dried, and thus kept perfectly sweet and clean.

The advantages of such a vessel are too obvious to require enumeration.

Having thus described my invention, what I claim is—

The herein-described can or vessel, consisting of an inner and an outer case with a layer of felt interposed, as a new article of manufacture.

SAMUEL STROOCK.

Witnesses:
AMORY EDWARDS,
T. E. THOMAS.